United States Patent
Kim et al.

(10) Patent No.: US 9,146,669 B2
(45) Date of Patent: Sep. 29, 2015

(54) PASSWORD PROCESSING METHOD AND APPARATUS

(75) Inventors: Jae-Hyung Kim, Seoul (KR);
Jong-Cheol Hong, Seoul (KR);
Hong-Geun Kim, Goyang-si (KR);
Bong-Ki Kwon, Gyeonggi-do (KR)

(73) Assignee: BIZMODELINE CO., LTD., Seoul (KR)

( * ) Notice: Subject to any disclaimer, the term of this patent is extended or adjusted under 35 U.S.C. 154(b) by 26 days.

(21) Appl. No.: 12/874,411

(22) Filed: Sep. 2, 2010

(65) Prior Publication Data

US 2011/0162066 A1      Jun. 30, 2011

(30) Foreign Application Priority Data

Dec. 29, 2009   (KR) .................. 10-2009-0133259

(51) Int. Cl.
| | |
|---|---|
| *G06F 3/0488* | (2013.01) |
| *G06F 21/31* | (2013.01) |
| *G06F 3/01* | (2006.01) |
| *G06F 21/36* | (2013.01) |

(52) U.S. Cl.
CPC ............ *G06F 3/04883* (2013.01); *G06F 3/017* (2013.01); *G06F 21/31* (2013.01); *G06F 21/36* (2013.01)

(58) Field of Classification Search
CPC ...... G06F 3/04883; G06F 21/36; G06F 21/31
USPC .......................................................... 726/18
See application file for complete search history.

(56) References Cited

U.S. PATENT DOCUMENTS

| | | | | |
|---|---|---|---|---|
| 6,151,009 | A  * | 11/2000 | Kanade et al. | 345/641 |
| 6,983,061 | B2 * | 1/2006  | Ikegami et al. | 382/115 |
| 7,054,470 | B2 * | 5/2006  | Bolle et al. | 382/124 |
| 7,574,070 | B2 * | 8/2009  | Tanimura et al. | 382/284 |
| 7,657,849 | B2 * | 2/2010  | Chaudhri et al. | 715/863 |
| 7,877,707 | B2 * | 1/2011  | Westerman et al. | 715/863 |
| 7,971,156 | B2 * | 6/2011  | Albertson et al. | 715/863 |
| 8,134,449 | B2 * | 3/2012  | Wu et al. | 340/5.85 |
| 8,174,503 | B2 * | 5/2012  | Chin | 345/173 |
| 8,452,260 | B2 * | 5/2013  | Matsuoka | 455/411 |
| 8,621,396 | B1 * | 12/2013 | Gossweiler, III | 715/863 |
| 8,638,939 | B1 * | 1/2014  | Casey et al. | 380/277 |
| 2006/0026535 | A1* | 2/2006 | Hotelling et al. | 715/863 |
| 2006/0075250 | A1* | 4/2006 | Liao | 713/182 |

(Continued)

FOREIGN PATENT DOCUMENTS

| | | |
|---|---|---|
| CN | 101587398 A | 11/2009 |
| JP | 2002-196855 A | 7/2002 |

(Continued)

OTHER PUBLICATIONS

Three-Dimensional Password for More Secure Authentication; Fawaz Alsulaiman et al.; IEEE Transactions on Instrumentation and Measurement, vol. 57, No. 9, Sep. 2008.*

(Continued)

*Primary Examiner* — James Turchen
(74) *Attorney, Agent, or Firm* — Maschoff Brennan

(57) ABSTRACT

A password processing method is provided. According to an embodiment, an object is displayed, and moved in at least one direction according to the user's motion. The password is processed in accordance with a combination of motions of the object in the at least one direction.

15 Claims, 8 Drawing Sheets

(56) References Cited

U.S. PATENT DOCUMENTS

| | | | |
|---|---|---|---|
| 2007/0041621 A1 | 2/2007 | Lin et al. | |
| 2008/0253659 A1 | 10/2008 | Walch | |
| 2008/0278455 A1* | 11/2008 | Atkins et al. | 345/173 |
| 2009/0036100 A1* | 2/2009 | Lee | 455/411 |
| 2009/0061823 A1* | 3/2009 | Chu | 455/411 |
| 2009/0064321 A1* | 3/2009 | Dick et al. | 726/21 |
| 2009/0165121 A1* | 6/2009 | Kumar | 726/19 |
| 2009/0259968 A1* | 10/2009 | Hsieh et al. | 715/808 |
| 2009/0289916 A1* | 11/2009 | Dai | 345/173 |
| 2009/0293119 A1* | 11/2009 | Jonsson | 726/19 |
| 2009/0303231 A1* | 12/2009 | Robinet et al. | 345/419 |
| 2009/0313693 A1* | 12/2009 | Rogers | 726/21 |
| 2009/0320123 A1 | 12/2009 | Yu et al. | |
| 2010/0020035 A1* | 1/2010 | Ryu et al. | 345/173 |
| 2010/0115610 A1* | 5/2010 | Tredoux et al. | 726/19 |
| 2010/0169958 A1* | 7/2010 | Werner et al. | 726/6 |
| 2010/0325721 A1* | 12/2010 | Bandyopadhyay et al. | 726/19 |
| 2011/0041102 A1* | 2/2011 | Kim | 715/863 |

FOREIGN PATENT DOCUMENTS

| | | |
|---|---|---|
| JP | 2005-202527 A | 7/2005 |
| JP | 2007-264929 A | 10/2007 |
| WO | 2011/081371 A1 | 7/2011 |

OTHER PUBLICATIONS

Graphical Passwords: Drawing a Secret With Rotation as a New Degree of Freedom; Saikat Chakrabarti et al.; Proceeding (561) Communication Systems and Networks—2007.*

Towards Identifying Usability and Security Features of Graphical Password in Knowledge Based Authentication Technique; 2008; Second Asia International Conference on Modelling & Simulation; IEEE.*

RSA Laboratories—7.20 What are biometric techniques? [Online: http://www.rsa.com/rsalabs/node/asp?id=2356].

International Search Report mailed Mar. 23, 2011 in related application No. PCT/KR2010/009342.

Written Opinion of the International Searching Authority dated Mar. 23, 2011 as received in application No. PCT/KR2010/009342.

* cited by examiner (a)

(b)

(c)

PASSWORD PROCESSING METHOD AND APPARATUS

CROSS-REFERENCE TO RELATED APPLICATION

The present application claims priority under 35 U.S.C. §119(a) to Korean Application No. 10-2009-0133259, filed on Dec. 29, 2009.

BACKGROUND

In general, an internet service, such as electronic transaction, internet banking, and online game, requires a user to register such service and to be authorized. User authentication includes, for example, receiving user identification (ID) and password through a web browser of a user terminal, transmitting them to a server, and determining whether the received information matches information stored in the server. Further, a password is also required in a mobile information processing device or a computer to execute some specified functions. A password includes characters, numbers, symbols, or a combination thereof.

DETAILED DESCRIPTION

Figure 1:
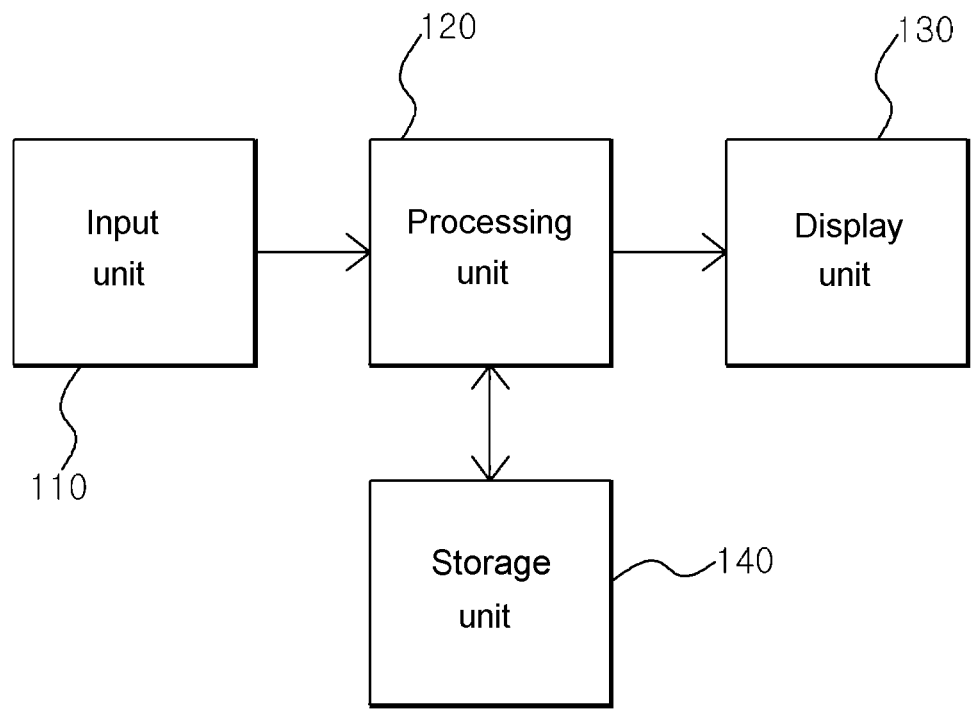
FIG. 1 is a block diagram showing an illustrative embodiment of an information processing device.

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented herein. It will be readily understood that the aspects of the present disclosure, as generally described herein, and illustrated in the Figures, can be arranged, substituted, combined, separated, and designed in a wide variety of different configurations, all of which are explicitly contemplated herein.

FIG. 1 is a block diagram showing an illustrative embodiment of an information processing device. An information processing device 100 may include a computer or a portable information device, such as a desktop computer, a workstation, a laptop computer, a palmtop computer, an ultra mobile personal computer (UMPC), a tablet personal computer (PC), a personal digital assistant (PDA), a web pad, a mobile phone, a smart phone, an electronic diary, an MP3 player, a portable multimedia player (PMP), and so on, but not limited thereto.

FIG. 1 illustrates that information processing device 100 includes a processing unit 120 and a display unit 130. Information processing device 100 may optionally further include an input unit 110 and a storage unit 140.

Input unit 110 receives data from an outside and transfers the data into information processing device 100. A user may input into input unit 110, for example, characters, or a command for starting applications stored in information processing device 100, or select one of options of a graphical user interface (GUI) on display unit 130. Input unit 110 may include a touch sensing unit (not shown) that generates touch information in response to user's touch and transmits the generated information to processing unit 120. Touch sensing unit may include a touch pad or a touch screen. The touch sensing unit detects the position where a user makes touch, as well as the presence of the touch. In one embodiment, the touch sensing unit may be integrated into display unit 130, but its implementation is not limited thereto. In some embodiments, input unit 110 may further include a keyboard and/or a mouse.

Processing unit 120 is configured to execute command and to generate or use data. For instance, processing unit 120 may transmit input and output data between components (e.g., display unit 130 and storage unit 140) of information processing device 100. Further, processing unit 120 may interpret input information such as touch information received by input unit 110, and it may display related images on display unit 130. Furthermore, processing unit 120 may perform tasks related to passwords, for example, inputting, generating, setting, resetting, and coding passwords when required or upon a user's request. Processing unit 120 may be implemented as a single chip, a plurality of chips, or on a plurality of electric components, and may have a form of a dedicated or imbedded processor, a single-purpose processor, a controller, an application-specific integrated circuit (ASIC), and so on.

Storage unit 140 is configured to store execution codes and data for information processing device 100. Storage unit 140 may store data and supply instructions and/or data to processing unit 120 in response to a request of processing unit 120. Examples of storage unit 140 may be read-only memory (ROM), random access memory (RAM), hard disk drive, memory card, PC card, CD-ROM, floppy disk, or magnetic tape.

Display unit 130 is configured to display a variety of information on a screen or a monitor, and may include, for example, a liquid crystal display, a cathode-ray tube (CRT), an organic light emitting diode, a plasma display monitor, etc. Display unit 130 may utilize a graphical user interface (GUI). The graphical user interface enables users to use applications that are executed in information processing device 100. For example, the graphical user interface may present to the users programs, functions, files, or operation options as graphical images. The graphical images may include windows, fields, dialog boxes, menus, icons, buttons, cursors, or scroll bars, and may include objects for inputting a password. The graphical images may be arranged on display unit 130 in a predetermined layout and may be dynamically generated depending on a kind of user's work. A user may select or activate a graphical image or perform a predetermined action associated with the graphical image in order to start functions or tasks related to the graphical image. For example, the user may select a function button or a menu icon, or displace or rotate the object.

Figure 2:
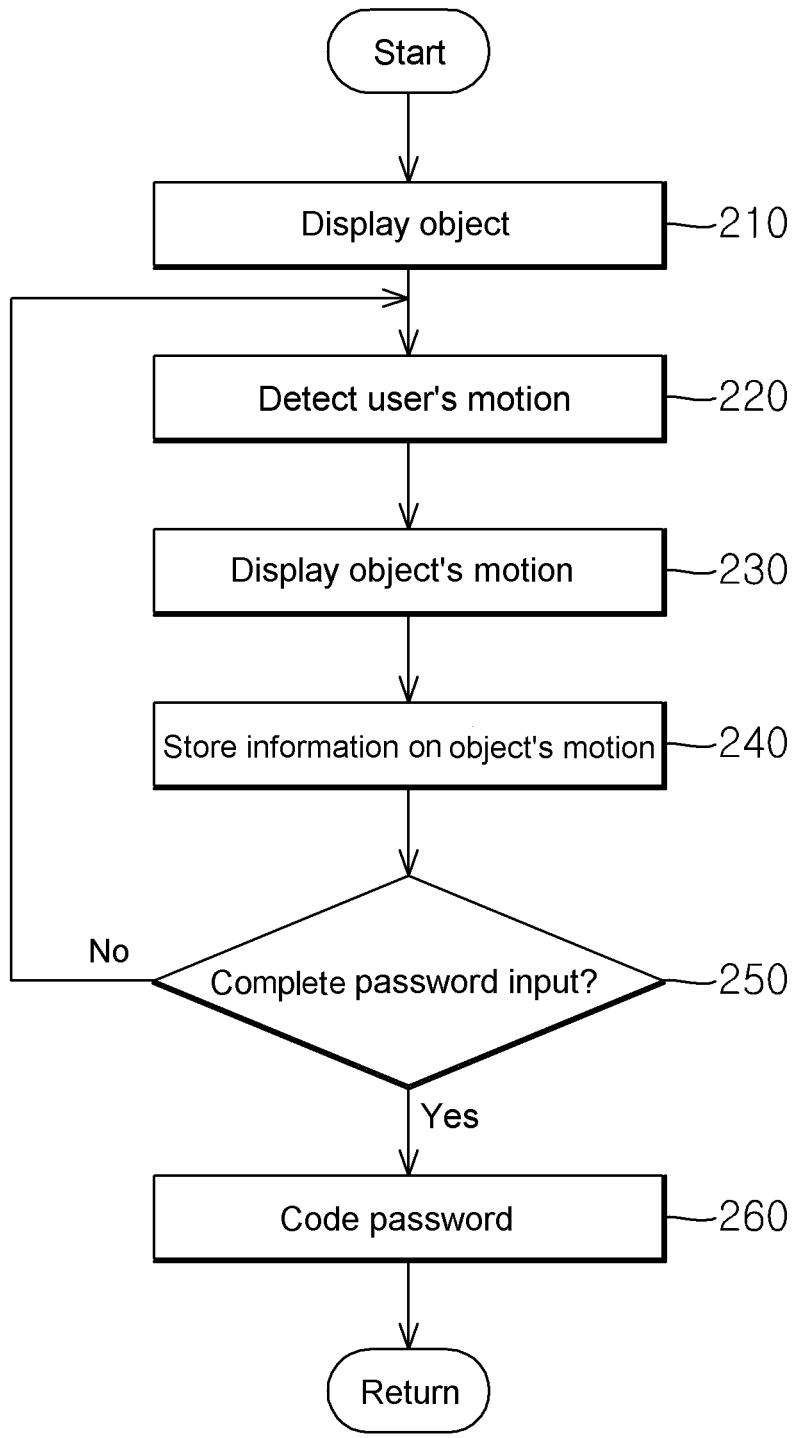
FIG. 2 is a flow chart showing an illustrative embodiment of a password processing method.
Figure 3:
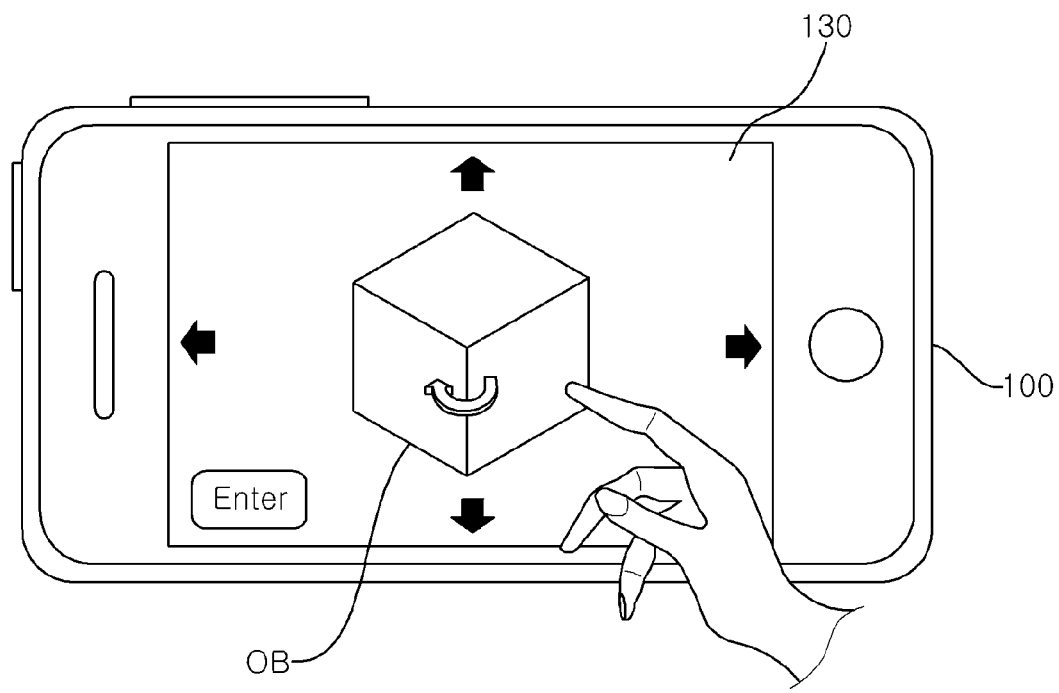
FIG. 3 is a schematic diagram of the information processing device shown in FIG. 1.

Referring to FIG. 2 and FIG. 3, an illustrative embodiment of a password processing method is described in detail. In an illustrative embodiment, a password processing method can be performed by information processing device 100 shown in FIG. 1. In another embodiment, a password processing method may be applied to any device or system that includes information processing device 100 shown in FIG. 1 in order to process a password. In still another embodiment, to the password processing method can be performed on any program that uses a password to open a file or to set a password for the file executed on the program.

FIG. 2 is a flow chart showing an illustrative embodiment of a password processing method, and FIG. 3 is a schematic diagram of the information processing device shown in FIG. 1.

Information processing device 100 may request a user to input into information processing device 100 a password when it is required for an operation or requested by the user. By way of examples, a password is required by information processing device 100 when a power is turned on to start operation of information processing device 100, when a specified function is used in information processing device 100, when a password is generated for the first time, or when a user resets a password, but not limited thereto.

Information processing device 100 may display an object OB on display unit 130 to request a user to input a password (210). Object OB is a graphical image such as a two-dimensional or three-dimensional figure. Examples of the two-dimensional figure are a triangle, a tetragon, a hexagon, a circle, a star, and examples of three-dimensional figure are a hexahedron, a tetrahedron, an octahedron, or a sphere. However, object OB is not limited thereto and may be an icon or a character, or may not have a patterned shape. For another example, object OB may include a two-dimensional or three-dimensional lattice or grid, at least one spot, at least one straight or curved line, or a combinational pattern thereof. Although, for the simplicity of descriptive, object OB is illustrated as a cube herein, it is apparent to those skilled in the art that object OB can have any shape or pattern other than the cube.

In one embodiment, object OB may have different colors or different patterns on the surfaces of object OB. In still another embodiment, information processing device 100 may add marks for rotational motion or displacement motion above or around object OB. The marks may include up, down, left and right arrows, or a rotation mark, but not limited thereto. By adding different colors, patterns, or marks to object OB, a user can easily distinguish and move the surfaces of object OB. In still further another embodiment, information processing device 100 may display some keys above or around object OB, such as an enter key to complete the input of the password, a correction key to correct the password input, a cancelation key to cancel the password input, and so on. For example, FIG. 3 illustrates that information processing device 100 displays an object OB at the center of display unit 130. Further, information processing device 100 further displays up, down, left and right arrows at upper, lower, left and right surfaces of display unit 130, and an enter key at the lower left corner of display unit 130. The enter key or the arrows may be placed at any location. The enter key and the arrows are optional and may be omitted.

Information processing device 100 may detect a user's motion based on the information inputted in input unit 110 since the input information depends on the user's motion (220).

In one embodiment in which input unit 110 includes a touch sensing unit, a user may touch a surface of the touch sensing unit using like a finger or a pen (but not limited thereto) to input password information into input unit 110. For another example, the user may input into input unit 110 the password information by performing "stroke." As used herein, the term "stroke" refers to the movement of the finger, etc., without taking off from the surface once the finger touches the surface of the touch sensing unit. The trajectory of the stroke dragged by the finger, etc., may be a straight or curved line, a series of straight or curved line segments, and so on. The user may touch or stroke the surface at the position above or around object OB displayed on display unit 130.

In another embodiment in which input unit 110 includes a mouse, rather than a touch sensing unit, a user may make a touch or perform a stroke by using a mouse pointer displayed on display unit 130. For example, the user may make the touch by left clicking of a mouse button, or perform the stroke by dragging and dropping the mouse button. In still another embodiment in which information processing device 100 includes a keyboard, a user may make a touch or perform a stroke by using corresponding keys on the keyboard.

Input unit 110 may generate input information on whether a touch or a stroke is performed by a user, or information on a position of the touch or the stroke trajectory, etc. Processing unit 120 may process the input information, and determine whether the user's motion is to displace object OB from one position to another position or to rotate object OB, or a direction that object OB is displaced or rotated, based on the position information of object OB currently displayed on display unit 130.

Information processing device 100 may display on display unit 130 the motion of object OB according to the detected user's motion (230). The motion of object OB is, for example, rotation or displacement. In one embodiment, the motion of object OB may be displayed on display unit 130 after the user's action is completed or during the action. For example, the displacement or the rotation of object OB may be displayed on display unit 130 when a user completes touching on a touch sensing unit. For another example, the displacement or the rotation of object OB may be displayed on display unit 130 during a finger's motion for performing a stroke motion. By displaying the motion of object OB on display unit 130, a user can easily remember his/her password and furthermore, easily check whether object OB is moved or not as he/she has intended to, thereby correcting or cancelling improper input.

The motions of the user and object OB are described in more detail with reference to FIG. 4 and FIG. 5.

Figure 4:
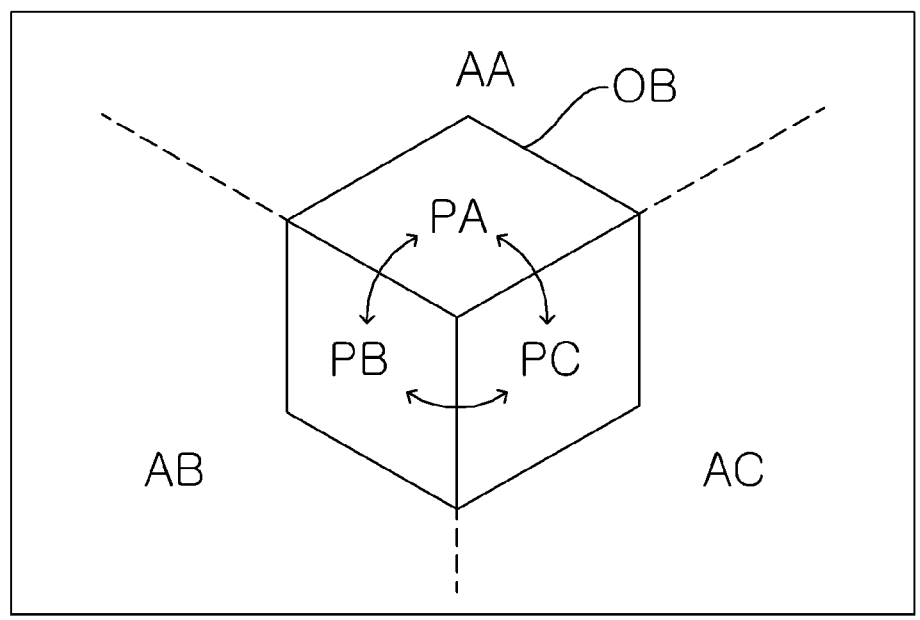
FIG. 4 is a schematic diagram showing an illustrative embodiment of the rotation of an object in the information processing device shown in FIG. 1.

FIG. 4 is a schematic diagram showing an illustrative embodiment of the rotation of an object in the information processing device shown in FIG. 1. FIG. 5 is a schematic diagram showing an illustrative embodiment of the displacement of an object in the information processing device shown in FIG. 1.

FIG. 4 illustrates that an object OB, i.e., a cube is displayed on display unit 130 of information processing device. Here, three surfaces PA, PB, PC are facing a front of display unit 130.

In one embodiment, when a user consecutively touches two surfaces among the three surfaces of object OB, object OB may rotate from the first-touched surface to the second-touched surface. As a result, object OB may rotate by an angle, for example, by a right angle, with respect to an untouched-surface serving as a rotational axis. For instance, when a user has touched surface PC, and then, touched surface PA, object OB rotates from surface PA to surface PC by a right angle with respect to surface PB serving as a rotational axis. For another instance, consecutive touches on areas AA, AB, AC respectively including surfaces PA, PB, PC may result in the rotation of object OB, as in surfaces PA, PB, PC.

In another embodiment, a user may perform a stroke on two surfaces among the three surfaces of object OB in order to rotate object OB in substantially the same way as in the rotation of object OB with touch of the three surfaces. For example, a starting position of a stroke corresponds to the firstly-touched surface, and an ending position of the stroke corresponds to the secondly-touched surface. Even when the starting and ending positions are on the same surface, object OB may be rotated according to the direction of the stroke. For example, when the starting and ending points of the stroke is on surface PB of object OB and a moving direction is toward surface PC, object OB may be rotated from surface PB to surface PC with respect to a rotational axis, i.e., surface PA. For another instance, a stroke on areas AA, AB, AC may result in the rotation of object OB, as in surfaces PA, PB, PC, respectively.

Figure 5:
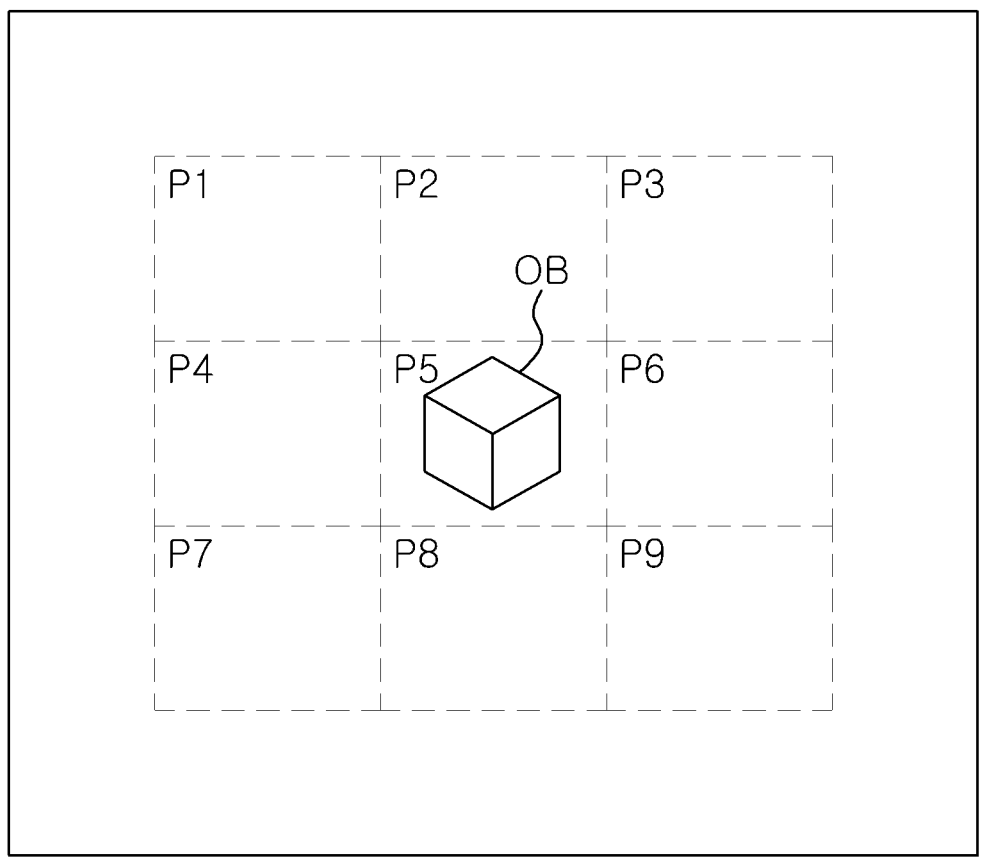
FIG. 5 is a schematic diagram showing an illustrative embodiment of the displacement of an object in the information processing device shown in FIG. 1.

FIG. 5 illustrates that an object OB and a grid including nine areas P1-P9 divided by dotted lines are displayed on display unit 130. But, the configuration shown in FIG. 5 is merely an example. For example, the number of areas may be more or less than nine. For another example, the divided areas may form different shapes, other than a grid. For still another example, the nine areas may be spaced apart. The dotted lines are also optional.

In one embodiment, when a user touches a position of an area, information processing device 100 may displace object OB from a current position or area to the touched position or area. As shown in FIG. 5, when the user touches a point on area P7, object OB may move from current area P5 to touched area P7.

In another embodiment, when a stroke starts at the area where object OB is currently located and ends at another area, object OB may move to the ended area. When the starting and ending points are on the same area, object OB may move in the direction of the stroke. For instance, when the starting and ending points of a stroke is on area P5 and the direction from the starting point to the ending point is toward area P7, object OB may be displaced from area P5 to area P7.

In the meantime, for example, a rectilinear stroke may be used to displace object OB and a curvilinear stroke may used to rotate object OB.

Therefore, a user can use either of or both of a touch and a stroke when he/she inputs a password into input unit 110, and information processing device 100 can detect both touch and stroke of the user to rotate or displace object OB. In some embodiments, information processing device 100 may provide special visual or sound effect for the displacement or the rotation of object OB.

Referring back to FIG. 2, information processing device 100 stores motion information of object OB inputted by a user (240). The motion information includes displacement information about to which area object OB is displaced and rotation information about in which direction object OB rotates. Operation 240 may be performed prior to, simultaneously with, or independent of operation 230 since operation 240 can be performed any time once the user's action is detected.

Information processing device 100 checks whether a user pushes or clicks an enter key to determine whether the input of the password is completed (250). When the user repeats touch or stroke for inputting the password without clicking the enter key, steps from 220 to 240 are repeated. When a stroke trajectory is a series of straight or curved line segments, etc., steps from 220 to 240 are performed for each line segment.

As described above, a password may include one of a displacement and rotation of object OB and a combination thereof. In one embodiment, an option for selecting the displacement or the rotation of object OB may be provided to a user. For example, a selection key for selecting the displacement and the rotation may be displayed on display unit 130.

After the user finishes the password input by pushing the enter key, information processing device 100 may code as a password the object motion information, which is accumulated sequentially through the above described processes (260).

Information processing device 100 compares the coded password with a preset password. When it is determined that the user inputs a correct password, an operation that has triggered the input of the password is performed. When it is determined that the user inputs an incorrect password the user is informed of a password error and requested to input a password again. In the meantime, when a password is generated for the first time or when a password is reset, steps from 210 to 260 are repeated twice and it is determined whether a password input is correct. If a correct password is inputted, a password generation or a password reset is completed.

Since a password may be made with a user's action, as described above, to the password is not easily hacked or exposed to hacking tools, unlike a password made with numbers, characters, or symbols. Thus, the password in accordance with the present disclosure can provide an improved security. Furthermore, a user's motion-based password is relatively easy to be memorized compared with a password made with numbers, etc., and thus a user can easily use and remember the motion-based password.

In one embodiment, when information processing device 100 displays object OB on display unit 130 to request a user to input a password (210), it may arbitrarily determine a display default value corresponding to an orientation or a position of object OB, which is shown first to the user. For example, when object OB has six surfaces colored respectively with different colors, the display default value of object OB may be any of the six colors. In FIG. 5, a default position of object OB may be any of the nine areas P1-P9.

A user moves the displayed object OB provided with a predetermined display default value to rearrange object OB to a first orientation or position that corresponds to the default value of a password, and then the user inputs a password into information processing device 100 by further moving object OB. Information processing device 100, which has stored the default password, determines whether object OB reaches the orientation or position corresponding to the default password based on the motion information of object OB inputted by the user. After object OB reaches the expected orientation or position, information processing device 100 receives the motion information of object OB as an actual input of the password, and then codes the password.

As described above, a user inputs a password after rearranging object OB from an orientation or position of object OB corresponding to a display default value to an orientation or position corresponding to a default password. Since that process can serve as one factor of a password input, a password security can be further enhanced. In other words, although the process for moving object OB from the display default value to the default password is not part of the password, that process can increase a security of the password because the process may be different for each input due to the arbitrarily determined display default value. Therefore, even if a hacking program acquires the motion information of object OB, the user who actually memorizes the password can get authentication.

In another embodiment, a password input can be performed with multiple objects. A password input may be performed by selecting one of multiple objects displayed on display unit 130 and by repeatedly displacing or rotating the selected object.

Another illustrative embodiment of a password processing method is described in detail with reference to FIG. 6 and FIG. 7.

Figure 6:
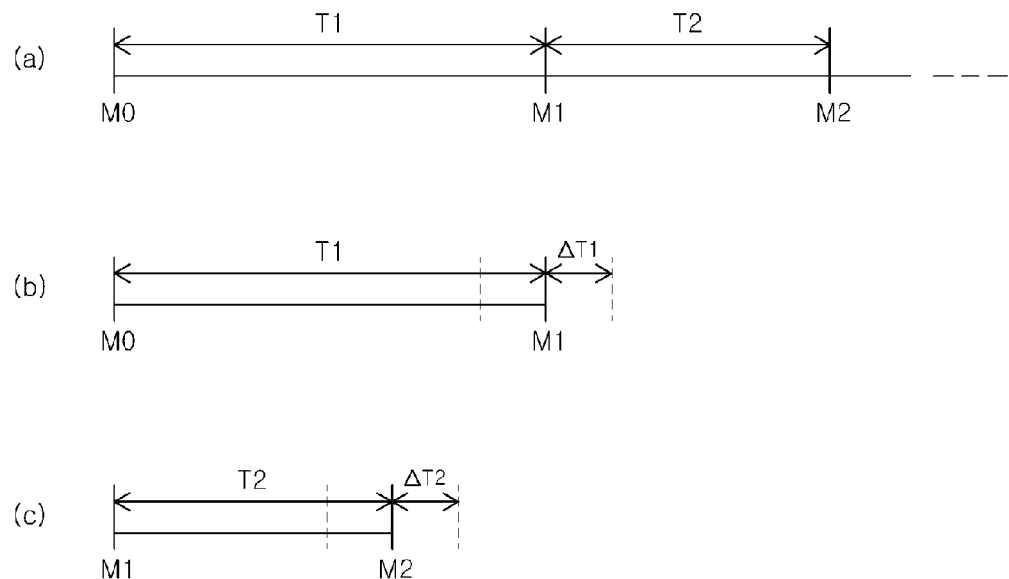
FIG. 6 is a schematic diagram illustrating an illustrative embodiment of a password processing method.

FIG. 6 is a schematic diagram illustrating another illustrative embodiment of a password processing method. FIG. 7 is a schematic diagram illustrating illustrative examples of passwords generated by the password processing method shown in FIG. 6.

In one embodiment, a password processing method processes a password input by using rhythm information along with motion information of an object. Since this method is substantially similar or identical to the above-described method, a difference between two methods is mainly described hereinafter for the simplicity of the description.

Herein, the term "rhythm information" refers to information about a time period or time interval of user's motions, for example, a time interval between a start touch of a motion of object OB and an ending touch of a motion of object OB. In case of a stroke having a rectilinearly- or curvilinearly-segmented trajectory, rhythm information may have time periods for which a user's finger, etc., moves corresponding to respective motions of object OB.

Referring to FIG. 6A, for example, information processing device 100 codes a time period T1 for moving object OB from a first position M0 to a second position M1 and a time period T2 from a second position M1 to a third position M2 according to a user's motion, etc., and corresponding motion information together, as a password. A user may be noticed that the rhythm information is included into the password. In one embodiment, a user may input a password with a certain rhythm pattern.

When the user inputs the password into information processing device 100, information processing device 100 performs user authentication within margin of the predetermined time periods for each password. For example, assuming that the user sets rhythm information about the password as the time periods T1 and T2 as shown in FIG. 6A, the password authentication can be performed within the margin of ±ΔT1, as shown in FIG. 6B, for the time period T1, and the margin of ±ΔT2, as shown in FIG. 6C, for the time period T2. Particularly, it can be determined that the rhythm information check for the motion of object OB from the first position M0 to the second position M1 is successful if the motion is performed within the time range between T1−ΔT1 and T1+ΔT1. However, if the time period is greater than the range, it can be determined that the password authentication is failed. Illustrative values of ΔT1 and ΔT2 may be about 20% of the time period T1 and the time period T2, respectively, but not limited thereto. In another example, the rhythm information may be checked in consideration of appropriate margins to the ratio of the time periods, without setting margin of time period. These are examples of the use of the rhythm information, and it is apparent to those skilled in the art that various methods can be used to perform password authentication by using the rhythm information.

Figure 7:
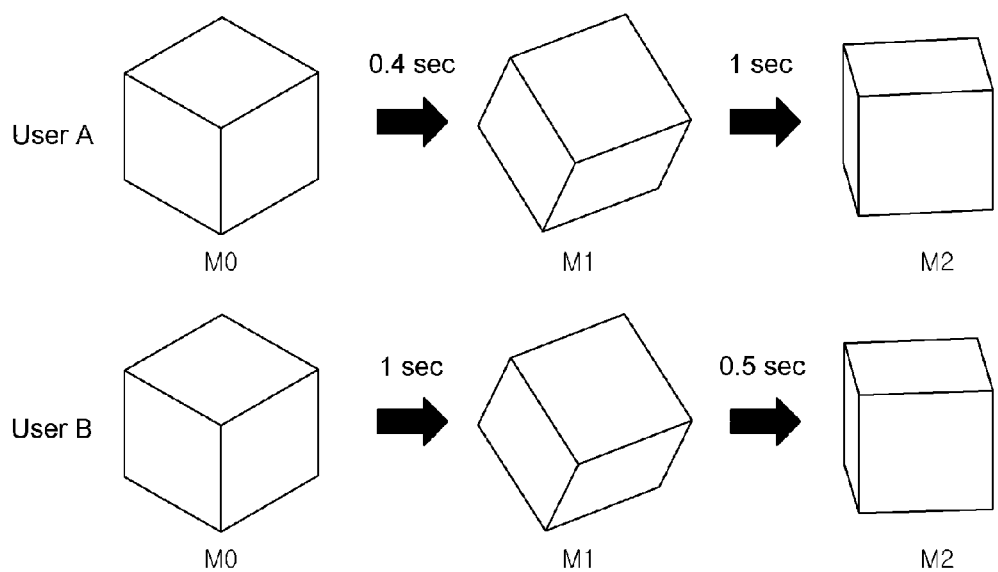
FIG. 7 is a schematic diagram illustrating illustrative examples of passwords generated by the password processing method shown in FIG. 6.

Referring to FIG. 7, the motion information for the user A and the user B may be the same since the user A and the user B moves objects OB to have the same position or orientation. However, if the time periods taken to move object OB for the user A and the user B are different, different rhythm information can be generated. Thus, the passwords for the user A and the user B may not be the same. By way of example, assuming that the password of the user A is the preset password, the user B inputs the password to be authorized, and the margin of time is 20%, as described above, the allowable time periods for the password authentication of the user A are 0.32-0.48 seconds for the displacement from the first position M0 to the second position M1 and 0.8-1.2 seconds from the second position M1 to the third position M2. In this case, the time period of the user B is not within the allowable time periods for the password of the user A, and the user B fails to get the password authentication if the time periods for the user B to input the password, as illustrated in FIG. 7, are one second and 0.5 seconds. By way of another example, when the password of the user B is the preset password and the user A inputs the password to be authorized, the password authentication of the user A turns out to fail. Thus, the user can perform the password authentication by setting and inputting the password with his/her unique rhythm pattern, thereby improving the security of the password.

Now, an illustrative embodiment of an information processing device is described in detail with reference to FIG. 8.

Figure 8:
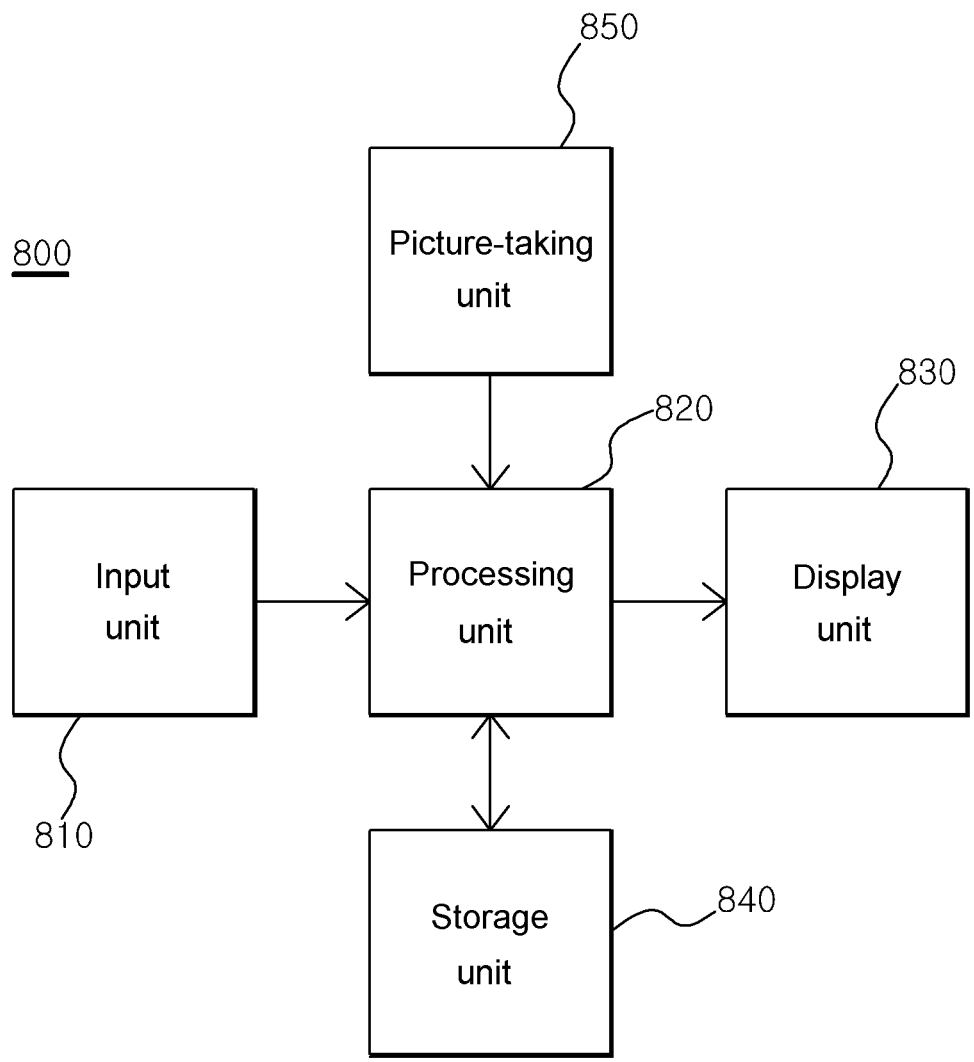
FIG. 8 is a block diagram showing an illustrative embodiment of an information processing device.

FIG. 8 is a block diagram showing an illustrative embodiment of an information processing device.

FIG. 8 illustrates that an information processing device 800 according to an embodiment includes an input unit 810, a processing unit 820, a display unit 830, a storage unit 840, and a picture-taking unit 850. Information processing device 800 may be substantially the same as the above-described information processing device 100. Input unit 810, processing unit 820, display unit 830, and storage unit 840 correspond to input unit 110, processing unit 120, display unit 130, and storage unit 140, respectively. Accordingly, redundant descriptions thereof will be omitted herein for the simplicity of description.

Picture-taking unit 850 includes a camera to obtain real images. Picture-taking unit 850 generates image data by appropriately processing the obtained image, and transmits the image data to processing unit 820. The camera may be imbedded in the device such as, a mobile phone or a mobile multimedia player, externally mounted on the device such as a webcam of a desktop computer, or incorporated into display unit 830 such as a head mounted display (HMD), but not limited thereto.

Processing unit 820 is configured to combine object OB with the inputted real image data to generate a new image that is displayed by display unit 830. Here, augmented reality (AR) technique is used to generate a new image by combining a graphical image, i.e., object OB with the real image data obtained by the camera. Information processing device 800 according to another embodiment of the disclosure processes the password by using the AR technique.

Storage unit 840 stores variously patterned information for the shapes of a person and the shapes of moving hands or fingers, etc. Moreover, storage unit 840 stores algorithms or programs that analyze and detect the user's motion.

By using the algorithms, etc., processing unit 820 analyzes the user's motion and detects the meaning of the user's motion based on the pattern information from storage unit 840 and the real image data from picture-taking unit 850. Processing unit 820 determines the motion of object OB according to the detected user's motion and displays it on display unit 830. Accordingly, information processing device 800 according to the present embodiment can process the password input by the user's motion although input unit 810 does not include the touch sensing unit.

Figure 9:
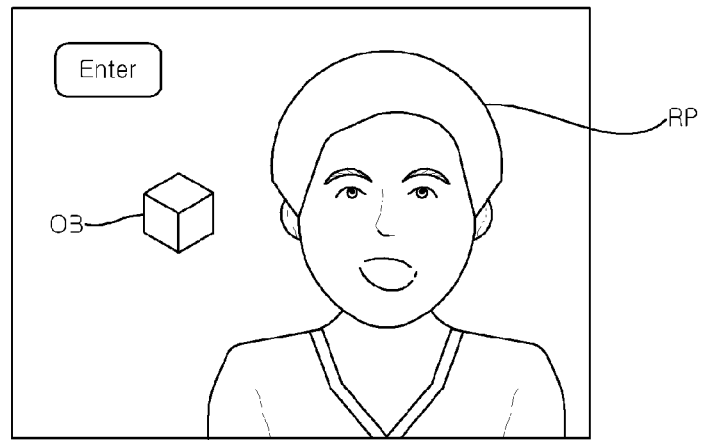
FIG. 9 is a schematic diagram showing an example of a screen for processing the password by the information processing device shown in FIG. 8.
Figure 9:
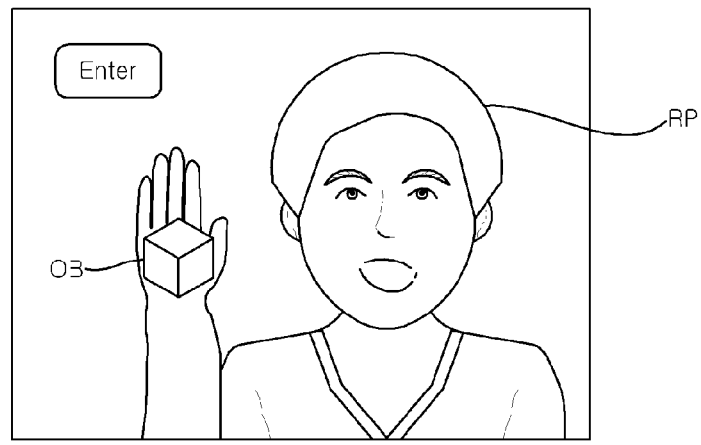
Figure 9:
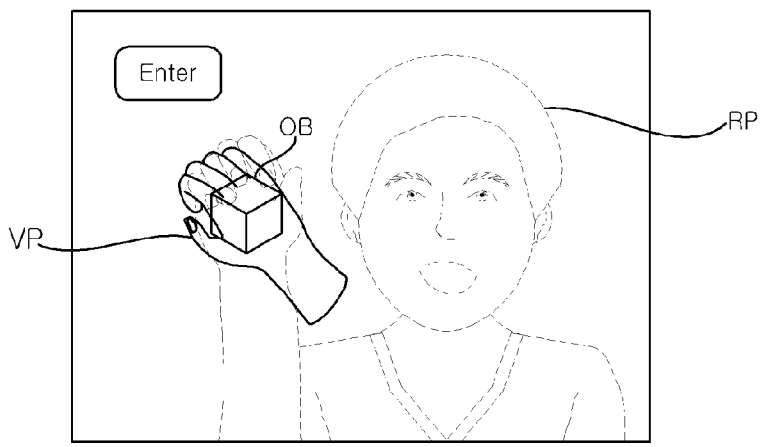
Figure 10:
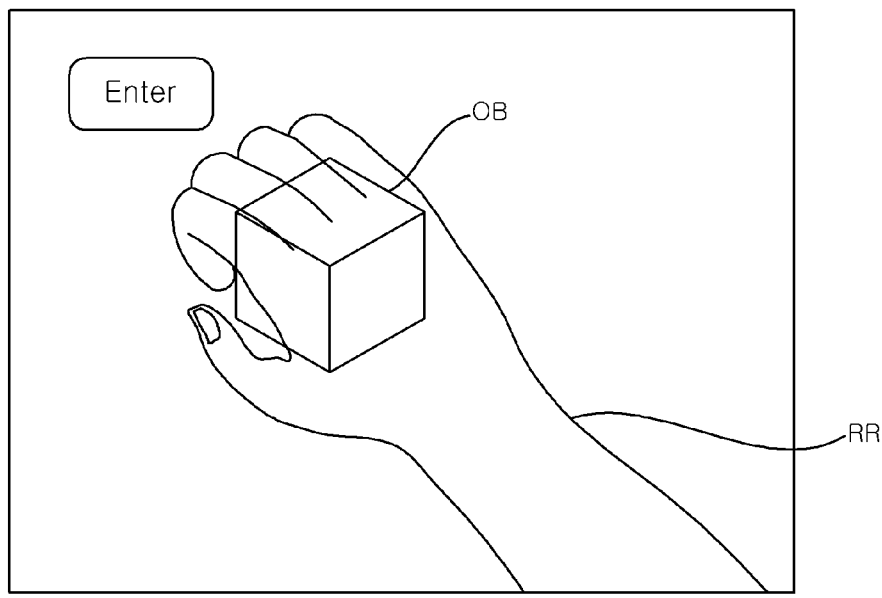
FIG. 10 is a schematic diagram showing an example of another screen for processing the password by the information processing device shown in FIG. 8.

Referring to FIG. 9 and FIG. 10, another illustrative embodiment of a password processing method where the information processing device processes the password using the AR technique is described in detail. The method illustrated in FIG. 9 and is substantially similar to that shown in FIG. 2. Thus, redundant descriptions thereof will be omitted herein for the simplicity of description.

FIG. 9 is a schematic diagram showing an example of a screen for processing the password by the information processing device shown in FIG. 8. FIG. 10 is a schematic diagram showing an example of another screen for processing the password by the information processing device shown in FIG. 8.

Information processing device 800 displays object OB on display unit 830 when it is required the user's password input. As shown in FIG. 9A, display unit 830 displays a real image RP of the user and the graphical image, i.e., object OB. Processing unit 820 may analyze real image data to detects the shape of the user's entire or half body or the position and the shape of a hand or a finger of the user, and, then, may make the camera zoom in or out the user or the hand in an appropriate magnification to display it at an appropriate size on the screen, but not limited thereto. Object OB is adjustably displayed in consideration of the size of the hand or the user, but not limited thereto. Object OB can be located at any position on the screen, for example, at the left or right empty part of the screen or on the chest or the head of the user. Object OB may be displayed on display unit 830 after real image RP of the user from picture-taking unit 850 is displayed, but not limited thereto.

As shown in FIG. 9B, the user sees the shape of the user himself/herself and object OB displayed on display unit 830 and reaches his/her hand toward object OB to overlap with object OB. The user's hand may not touch display unit 830, and thus the user's motion may be physically separated from display unit 830 and object OB. If the user's hand is located in a real background space that is covered with object OB displayed on display unit 830 and is not shown, the hand and object OB are displayed to overlap each other.

Then, referring to FIG. 9C, information processing device 800 can display a graphical image VP of a hand shape along with object OB. Virtual hand VP is shown as it extends from the user to the front direction, and thus the user feels virtual hand VP arranged in the same direction as his real hand. Referring to FIGS. 9A to 9C, if the camera of picture-taking unit 850 faces the user like that of the desktop computer, the displayed images are arranged in reverse to the direction that the user sees and thus it is hard for the user to manipulate object OB displayed on display unit 830. Therefore, by displaying virtual hand VP arranged in the direction the user sees, together with object OB, the user can easily move object OB. When input unit 810 includes a touch sensing unit, the user may touch or stroke display unit 830 to move object OB. In the meantime, once virtual hand VP is displayed, real image RP may become faint, but not limited thereto.

Information processing device 800 moves object OB in response to the user's gesture. In detail, information processing device 800 analyzes the real shape of the user's moving hand and changes the shape of virtual hand VP correspondingly. For example, when the user grabs object OB with the hand and rotates or displaces object OB, the displayed virtual hand VP follows the motion of the real hand. The manipulation of object OB by the real finger is also reflected to the motion of the finger of virtual hand VP. Furthermore, information processing device 800 moves object OB in accordance with the user's gesture. The user can use both the right and left hands, and information processing device 800 distinguishes and detects them. When the user changes the manipulating hand to the right or left hand in order to facilitate the manipulation of object OB, information processing device 800 can change the shape of virtual hand VP correspondingly. The user can manipulate object OB as if it is floating in a space, and the corresponding motion of object OB is displayed on display unit 830. The user uses virtual hand VP to displace or rotate object OB for inputting the password.

The screen shots shown in FIG. 9A to FIG. 9C are only one of several examples, and the user's motion, virtual hand VP, and the motion of object OB may be displayed in various different ways.

As shown in an example shown in FIG. 10, when the camera faces the direction as the user faces, like that of the mobile phones or Head-Mounted Display (HMD), information processing device 800 moves object OB directly according to the motion of a user's hand RR of the real image. The user moves his/her hand RR displayed on display unit 830 to displace or rotate object OB, thereby inputting the password. It is also possible to touch or stroke a touch-sensing surface directly for moving object OB if input unit 810 includes a touch sensing unit.

In the meantime, information processing device 800 using the AR technique may prepare a separate marker and displays object OB on the marker to process the password. The marker may be a white pattern on a black background or a black tetragon on a white background, but not limited thereto. The marker may be attached to a user or a desk if necessary and the user moves object OB displayed on the marker to input the password. Furthermore, the user may manipulate object OB by wearing a glove or a finger cap used in a virtual reality application to input the password.

Information processing device 800 according to the present embodiment may use the rhythm information, as well as the motion information of object OB for processing the password as described above.

Next, another illustrative embodiment of a password processing system is described in detail with reference to FIG. 11.

Figure 11:
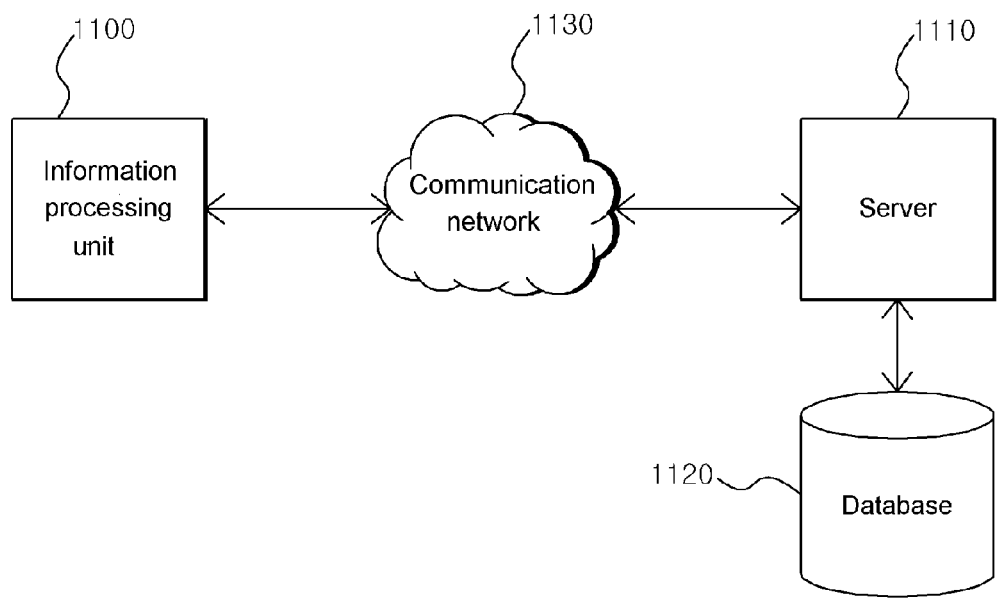
FIG. 11 is a block diagram illustrating an illustrative password processing system according to another embodiment of this disclosure.

FIG. 11 is a block diagram illustrating an illustrative password processing system according to another embodiment of this disclosure.

Another illustrative embodiment of a password processing system includes a server 1110 and a database 1120 connected thereto, and it is connected to an information processing device 1100 through a communication network 1130.

Information processing device 1100 may be substantially the same as information processing devices 100 and 800 as described above, and thus redundant descriptions thereof will be omitted herein for the simplicity of description. Information processing device 1100 includes a communication unit (not shown) in communications with server 1110, a browser (not shown), and a password generating module (not shown).

The browser displays a web page including a log-in box based on the web page information transmitted from server 1110. The user inputs ID in the log-in box and then he/she generates a password and transmits it to server 1110 to request for the user authentication. The browser receives an authentication success massage or an authentication failure massage from server 1110 and displays the message on information processing device 1100. The browser may be selectively included in information processing device 1100. Alternatively, a password-generation module or a separate application program, instead of the browser, may request for the user authentication.

The password-generation module is an application program that can perform the password processing method according to the above-described embodiments. Information processing device 1100 may be supplied with the password-generation module from server 1110, may install it to information processing device 1100, and may execute it to generate the password, but not limited thereto. The password-generation module may be pre-installed to information processing device 1100. The user requests the password input for the user authentication and inputs the password by moving object OB using touch, stroke, or the AR technique, and the password-generation module codes the password correspondingly. The password-generation module may use various coding methods for coding the user information about the ID inputted by the user and/or the coded password, etc. An example of the coding methods is Rivest-Shamir-Adleman (RSA) method that is a representative open-key coding technique, but not limited thereto.

Communication network 1130 may include phone networks, as well as data networks such as local area network (LAN), metropolitan area network (MAN), wide area network (WAN), and internet, regardless of wired or wireless, and it may use any type of communications.

Database 1120 stores user information about user IDs, coded passwords, user names, social security numbers, addresses, e-mail addresses, and so on. It is noted that database 1120 may store coded passwords by hash algorithm such as "message digest 5 (MD5)" without directly storing the password for security. Database 1120 provides the user information for server 1110 in response to the request of server 1110. Database 1120 may be selectively included in the password processing system.

Server 1110 provides web pages related to internet service including a log-in page for information processing device 1100 upon the request of information processing device 1100. In addition, server 1110 transmits the password-generation module to information processing device 1100 such that the user can input the password through the password-generation module. Moreover, server 1110 performs the user authentication upon the request of information processing device 1100. Server 1110 decodes the coded user information from information processing device 1100 and determines whether it matches with the user information stored in database 1120. After finishing the user authentication, server 1110 transmits an authentication message to information processing device 1100. The authentication message may be one of the authentication success message and the authentication failure message.

The illustrative password processing system according to the embodiments may be utilized in systems including an internet service system that requires the user authentication.

While a conventional password including characters or numbers for the internet service through communication network 1130 has high possibility of hacking, the password processing system according to the present embodiments reduces the probability of hacking because the password is generated based on the motion of object OB according to the user's motion.

The user interfacing method according to another embodiment of this disclosure may selectively include the processes of the above-described password processing methods.

Another embodiment includes media that can be read by a computer and includes program instructions for executing the operations that may be implemented by various computers. The media records a program for performing the above-described password processing methods and user interfacing methods. The media may include at least one of program instructions, data files, and data structures and a combination thereof. Examples of the media include magnetic media such as hard disks, floppy disks, and magnetic tapes, optical media such as CDs and DVDs, magnetic-optical media such as Floptical Disks, and hardware devices such as ROMs, RAMs, and flash memories that are configured to store and execute program instructions. The media may be transmission media such as optical or metal lines, waveguides, etc., which include carriers containing signals for designating program instructions, data structures, etc. Examples of program instructions may include machine codes that may be made by compilers as well as high-level language codes executed by a computer via an interpreter.

In an illustrative embodiment, any of the operations, processes, etc. described herein can be implemented as computer-readable instructions stored on a computer-readable medium. The computer-readable instructions can be executed by a processor of a mobile unit, a network element, and/or any other computing device.

There is little distinction left between hardware and software implementations of aspects of systems; the use of hardware or software is generally (but not always, in that in certain contexts the choice between hardware and software can become significant) a design choice representing cost vs. efficiency tradeoffs. There are various vehicles by which processes and/or systems and/or other technologies described herein can be effected (e.g., hardware, software, and/or firmware), and that the preferred vehicle will vary with the context in which the processes and/or systems and/or other technologies are deployed. For example, if an implementer determines that speed and accuracy are paramount, the implementer may opt for a mainly hardware and/or firmware vehicle; if flexibility is paramount, the implementer may opt for a mainly software implementation; or, yet again alternatively, the implementer may opt for some combination of hardware, software, and/or firmware.

The foregoing detailed description has set forth various embodiments of the devices and/or processes via the use of block diagrams, flowcharts, and/or examples. Insofar as such block diagrams, flowcharts, and/or examples contain one or more functions and/or operations, it will be understood by those within the art that each function and/or operation within such block diagrams, flowcharts, or examples can be implemented, individually and/or collectively, by a wide range of hardware, software, firmware, or virtually any combination thereof. In one embodiment, several portions of the subject matter described herein may be implemented via Application Specific Integrated Circuits (ASICs), Field Programmable Gate Arrays (FPGAs), digital signal processors (DSPs), or other integrated formats. However, those skilled in the art will recognize that some aspects of the embodiments disclosed herein, in whole or in part, can be equivalently implemented in integrated circuits, as one or more computer programs running on one or more computers (e.g., as one or more programs running on one or more computer systems), as one or more programs running on one or more processors (e.g., as one or more programs running on one or more microprocessors), as firmware, or as virtually any combination thereof, and that designing the circuitry and/or writing the code for the software and/or firmware would be well within the skill of one of skill in the art in light of this disclosure. In addition, those skilled in the art will appreciate that the mechanisms of the subject matter described herein are capable of being distributed as a program product in a variety of forms, and that an illustrative embodiment of the subject matter described herein applies regardless of the particular type of signal bearing medium used to actually carry out the distribution. Examples of a signal bearing medium include, but are not limited to, the following: a recordable type medium such as a floppy disk, a hard disk drive, a CD, a DVD, a digital tape, a computer memory, etc.; and a transmission type medium such as a digital and/or an analog communication medium (e.g., a fiber optic cable, a waveguide, a wired communications link, a wireless communication link, etc.).

Those skilled in the art will recognize that it is common within the art to describe devices and/or processes in the fashion set forth herein, and thereafter use engineering practices to integrate such described devices and/or processes into data processing systems. That is, at least a portion of the devices and/or processes described herein can be integrated into a data processing system via a reasonable amount of experimentation. Those having skill in the art will recognize that a typical data processing system generally includes one or more of a system unit housing, a video display device, a memory such as volatile and non-volatile memory, processors such as microprocessors and digital signal processors, computational entities such as operating systems, drivers, graphical user interfaces, and applications programs, one or more interaction devices, such as a touch pad or screen, and/or control systems including feedback loops and control motors (e.g., feedback for sensing position and/or velocity; control motors for moving and/or adjusting components and/or quantities). A typical data processing system may be implemented utilizing any suitable commercially available components, such as those typically found in data computing/communication and/or network computing/communication systems.

The herein described subject matter sometimes illustrates different components contained within, or connected with, different other components. It is to be understood that such depicted architectures are merely examples, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected", or "operably coupled", to each other to achieve the desired functionality, and any two components capable of being so associated can also be viewed as being "operably couplable", to each other to achieve the desired functionality. Specific examples of operably couplable include but are not limited to physically mateable and/or physically interacting components and/or wirelessly interactable and/or wirelessly interacting components and/or logically interacting and/or logically interactable components.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations. In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

In addition, where features or aspects of the disclosure are described in terms of Markush groups, those skilled in the art will recognize that the disclosure is also thereby described in terms of any individual member or subgroup of members of the Markush group.

As will be understood by one skilled in the art, for any and all purposes, such as in terms of providing a written description, all ranges disclosed herein also encompass any and all possible subranges and combinations of subranges thereof. Any listed range can be easily recognized as sufficiently describing and enabling the same range being broken down into at least equal halves, thirds, quarters, fifths, tenths, etc. As a non-limiting example, each range discussed herein can be readily broken down into a lower third, middle third and upper third, etc. As will also be understood by one skilled in the art all language such as "up to," "at least," and the like include the number recited and refer to ranges which can be subsequently broken down into subranges as discussed above. Finally, as will be understood by one skilled in the art, a range includes each individual member. Thus, for example, a group having 1-3 cells refers to groups having 1, 2, or 3 cells. Similarly, a group having 1-5 cells refers to groups having 1, 2, 3, 4, or 5 cells, and so forth.

From the foregoing, it will be appreciated that various embodiments of the present disclosure have been described herein for purposes of illustration, and that various modifications may be made without departing from the scope and spirit of the present disclosure. Accordingly, the various embodiments disclosed herein are not intended to be limiting, with the true scope and spirit being indicated by the following claims.

The invention claimed is:

1. A method to process a password, the method comprising:
controlling, by a processor, a display to display multiple computer-generated objects;
receiving, by the processor, input effective to select a particular computer-generated object from amongst the displayed multiple computer-generated objects;
receiving, by the processor, input corresponding to a plurality of detected motions, the plurality of detected motions being effective to move and rotate the particular computer-generated object in its entirety on the display in at least one direction in accordance with the plurality of detected motions, each of the detected motions having a corresponding time period of a plurality of time periods;
generating, by the processor, the password using the plurality of detected motions and the plurality of time periods; and
authenticating a user using the generated password and an identified unrevealed authentication, wherein authenticating the user includes indicating an authentication failure when the plurality of detected motions are different from an expected input and any of the corresponding time periods are outside of an allowable time range.

2. The method of claim 1, wherein the plurality of detected motions comprises at least one of touch, stroke, and gesture.

3. The method of claim 1, wherein controlling the display to display the particular computer-generated object comprises:
combining the computer-generated object with actual image data; and
controlling the display to display the combined image.

4. The method of claim 3, wherein controlling the display to display the combined image comprises:
controlling the display to display a hand shape that includes either a graphical image or an actual image.

5. The method of claim 1, wherein receiving the input corresponding to the plurality of detected motions does not include sensing contact with a screen whereupon the particular computer-generated object is displayed.

6. The method of claim 1, wherein the particular computer-generated object comprises at least one of a triangle, a tetragon, a hexagon, a circle, a star, a hexahedron, a tetrahedron, an octahedron, and a sphere.

7. The method of claim 1, wherein generating the password comprises:
coding information on the movement and rotation of the particular computer-generated object that is accumulated in sequence.

8. A device to process information, the device comprising:
a display configured to display multiple computer-generated objects; and
a processor coupled to the display and configured to:
receive input effective to select a particular computer-generated object from amongst the displayed multiple computer-generated objects;
receive input corresponding to a plurality of detected motions;
move and rotate the particular computer-generated object in its entirety in at least one direction in response to the input corresponding to the plurality of detected motions and in accordance with the plurality of detected motions, each of the plurality of detected motions having a corresponding time period of a plurality of time periods;
generate a password using the plurality of detected motions and the plurality of time periods; and
authenticate a user by use of the generated password and an identified unrevealed authentication, wherein authentication of the user includes an indication of an authentication failure when the plurality of detected motions are different from an expected input and any of the corresponding time periods are outside of an allowable time range.

9. The device of claim 8, wherein the plurality of detected motions comprises at least one of touch, stroke, and gesture.

10. The device of claim 8, wherein the processor is further configured to combine the particular computer-generated object with actual image data, and to control the display to display the combined image.

11. The device of claim 10, wherein the processor is further configured to control the display to display a hand shape that includes either a graphical image or an actual image.

12. The device of claim 8, wherein the plurality of detected motions is not received by sensing contact with a screen whereupon the particular computer-generated object is displayed.

13. The device of claim 8, wherein the particular computer-generated object comprises at least one of a triangle, a tetragon, a hexagon, a circle, a star, a hexahedron, a tetrahedron, an octahedron, and a sphere.

14. The device of claim 8, wherein the processor is further configured to code information on the movement and rotation of the particular computer-generated object that is accumulated in sequence.

15. A method to process a password, the method comprising:
instructing, by a processor, multiple computer-generated objects to be displayed on a display;
receiving, by the processor, input effective to select a particular computer-generated object from amongst the displayed multiple computer-generated objects;
receiving, by the processor, input corresponding to a plurality of detected motions, each of the detected motions having a corresponding time period of a plurality of time periods;
moving and rotating, by the processor, the particular computer-generated object in its entirety in at least one direction on the display in response to the input corresponding to the plurality of detected motions and according to the plurality of detected motions, wherein the particular computer-generated object includes a first segmented trajectory after the particular computer-generated object moves in its entirety in the at least one direction on the display;
generating, by the processor, the password using the plurality of detected motions and the plurality of time periods wherein the password corresponds to an unrevealed authentication; and authenticating, by the processor, a user in response to a determination that the generated password matches a preset password, wherein authenticating the user includes indicating an authentication failure when the plurality of detected motions are different from an expected input and any of the corresponding time periods are outside of an allowable time range.

* * * * *

UNITED STATES PATENT AND TRADEMARK OFFICE
CERTIFICATE OF CORRECTION

| | | |
|---|---|---|
| PATENT NO. | : 9,146,669 B2 | Page 1 of 1 |
| APPLICATION NO. | : 12/874411 | |
| DATED | : September 29, 2015 | |
| INVENTOR(S) | : Kim et al. | |

It is certified that error appears in the above-identified patent and that said Letters Patent is hereby corrected as shown below:

In the Specification:

In Column 1, Line 8, delete "§119(a)" and insert -- § 119(a) --, therefor.

In the Claims:

In Column 16, Lines 65-66, in Claim 15, delete "time periods" and insert -- time periods, --, therefor.

Signed and Sealed this
Twenty-third Day of August, 2016

Michelle K. Lee
*Director of the United States Patent and Trademark Office*